J. THIRLWELL.
Cultivator.
No. 24,418.
Patented June 14, 1859.
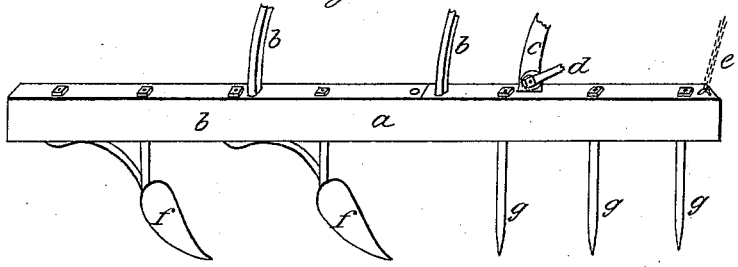
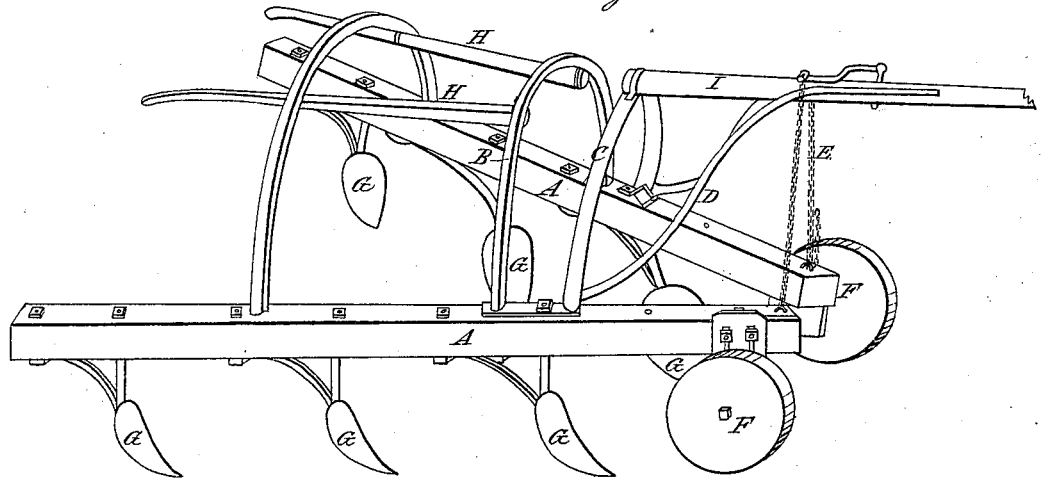
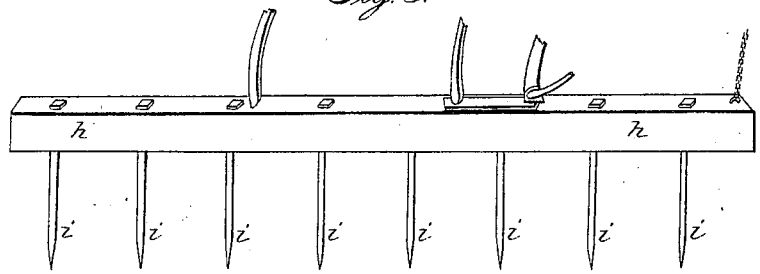
Witnesses:
A. N. Carpenter
A. G. Babcock
Inventor:
Joseph Thirlwell

UNITED STATES PATENT OFFICE.

JOSEPH THIRLWELL, OF GALESBURG, ILLINOIS.

IMPROVEMENT IN CULTIVATORS.

Specification forming part of Letters Patent No. 24,418, dated June 14, 1859.

*To all whom it may concern:*

Be it known that I, JOSEPH THIRLWELL, of Galesburg, in the county of Knox and State of Illinois, have invented a new and useful Improvement in Cultivators for the purpose of dressing fields of corn, potatoes, or any other kinds of grain or vegetables when planted in rows or hills; and I do hereby declare that the following is a full and exact description thereof, reference being had to the accompanying drawings, and to the letters of reference marked thereon.

The harrow or V-shaped wooden frame is left a little open at the front or forward end, the object of which is to operate astride of the rows. The wooden frame is held in position by two iron bows or semicircles at a proper distance apart, and of sufficient height to pass over the grain or vegetables at the usual size or growth when cultivation ceases. Near the forward end is a third iron bow, at the top and center of which is attached the butt-end of the tongue, and each end is fastened to the wooden frame by a hinge, as is also a brace on each side, extending upward and forward and attached to the tongue. To the stationary bows are attached two handles, extending back and sufficiently far apart to admit of the tender walking between them for the purpose of guiding the cultivator. At the extreme forward end of the frame a chain is passed over the tongue and fastened to the frame on each side, for the purpose of raising the cultivator from the ground when a change of position is required. Upon the under side of the frame are six teeth, three on each side, with shanks passing up through the frame and secured by nuts at the top; also a brace extends back from each tooth, and is secured to the frame by a bolt, or otherwise. The teeth are constructed in the form of a shovel, being broad at the top of the blade and gradually narrowing and rounding to a point at the bottom. The whole blade is also scooped or bent forward, and so arranged in the frame as to stand diagonally to the row, each blade or tooth turning the earth inward, or toward the row being cultivated.

When the grain or vegetables are small and do not admit of being hilled up the front tooth may be removed and three harrow-teeth be substituted in its place for the purpose of pulverizing the ground and destroying weeds or grass; or, if desired, all the cultivator-teeth may be removed and an entire set of common harrow-teeth be substituted in their stead, forming an ordinary harrow.

The blades of the cultivator-teeth are constructed of steel smoothly polished, and by being set diagonally the earth passes readily over the front surface, keeping them perfectly smooth, bright, and clean—an advantage which it is believed no other cultivator now in use possesses.

At the forward end of the frame are two wheels, one on each side, and at a proper distance from the frame for the purpose of gaging the depth of the teeth in the soil. The wheels turn on a shank or axle-tree which is attached to a plate with slots, and fixed to the frame by bolts, so as to be raised or lowered at pleasure.

To enable others skilled in the art to make and use my invention, I will proceed to describe its construction and operation, and with reference to the drawings.

Figure 1 represents a perspective view; Figs. 2 and 3, longitudinal sections.

A A, Fig. 1, represents the wooden frame; B B, the iron bows for holding the frame in position; C, the hinge-bow for holding the tongue and allowing it an up-and-down motion; D D, the tongue-braces; E, the lifting-chain; F, the gage-wheels; G, the cultivator teeth or blades; H, the guide-handles, and I the tongue.

$a$, Fig. 2, represents a side section of the wooden frame; $b\ b$, sections of the stationary bows; $c$, the hinge-bow; $d\ d$, the tongue-braces; $e$, the lifting-chain; $f\ f$, the cultivator-teeth; $g\ g\ g$, the harrow-teeth, to be used in this form when the grain or vegetables are too small for hilling.

$h\ h$, Fig. 3, represent a side section of the wooden frame with a full set of common harrow-teeth, $i\ i\ i\ i\ i\ i\ i\ i$, instead of the cultivator or cultivator and harrow teeth combined.

Having thus fully described my invention, what I claim therein as new, and wish to secure by Letters Patent, is—

The arrangement of the frame A A, the iron bows B B, the hinge-bow C, the tongue-braces D D, and lifting-chain E, when constructed and used in combination, for the purposes set forth.

JOSEPH THIRLWELL.

Witnesses:
   A. N. CARPENTER,
   A. G. BABCOCK.